(12) United States Patent
Hoffman

(10) Patent No.: US 6,459,998 B1
(45) Date of Patent: Oct. 1, 2002

(54) SENSING DOWNED POWER LINES

(76) Inventor: Gary R. Hoffman, 32 Phyllis Pl., Randolph, NJ (US) 07869

( * ) Notice: Subject to any disclaimer, the term of this patent is extended or adjusted under 35 U.S.C. 154(b) by 164 days.

(21) Appl. No.: 09/619,516

(22) Filed: Jul. 19, 2000

Related U.S. Application Data (60) Provisional application No. 60/187,258, filed on Mar. 6, 2000, provisional application No. 60/145,518, filed on Jul. 24, 1999, and provisional application No. 60/146,721, filed on Aug. 2, 1999.

(51) Int. Cl.[7] ................................................ H02H 3/00
(52) U.S. Cl. ..................... 702/62; 700/292; 700/293; 700/294; 361/64; 361/66; 361/68; 340/661
(58) Field of Search ................................. 700/286, 292, 700/293, 294, 295, 296; 702/57, 58, 59, 60, 61, 62; 361/62, 63, 64, 65, 66, 67, 68; 340/657, 661

(56) References Cited

U.S. PATENT DOCUMENTS

| | | | | |
|---|---|---|---|---|
| 5,216,621 A | * | 6/1993 | Dickens ........................ | 324/500 |
| 5,455,776 A | * | 10/1995 | Novosel ....................... | 324/509 |
| 5,537,327 A | * | 7/1996 | Snow et al. ................... | 361/92 |
| 5,550,751 A | * | 8/1996 | Russell ......................... | 361/90 |
| 5,565,783 A | * | 10/1996 | Lau et al. ..................... | 324/127 |
| 5,600,526 A | * | 2/1997 | Russell et al. ................ | 361/115 |
| 5,602,709 A | * | 2/1997 | Al-Dabbagh ................. | 324/520 |
| 5,734,575 A | * | 3/1998 | Snow et al. ................... | 361/92 |
| 5,793,750 A | * | 8/1998 | Schweitzer et al. ........... | 361/64 |
| 6,005,757 A | * | 12/1999 | Shvach et al. ................ | 361/64 |
| 6,061,609 A | * | 5/2000 | Kanoi et al. .................. | 340/567 |
| 6,088,658 A | * | 7/2000 | Yazici et al. ................. | 702/180 |
| 6,212,049 B1 | * | 4/2001 | Spencer et al. ............... | 361/64 |
| 6,292,340 B1 | * | 9/2001 | O'Regan et al. ............. | 361/115 |
| 6,341,054 B1 | * | 1/2002 | Walder et al. ............... | 361/115 |
| 6,347,027 B1 | * | 2/2002 | Nelson et al. ................ | 361/64 |

OTHER PUBLICATIONS

Patterson et al., "A Microprocessor–based Digital Feeder Monitor with High–Impedance Fault Detection", IEEE, 1994.*
Wester, "High Impedance Fault Detection on Distribution Systems", IEEE, date unknown.*
Benner et al., "Practical High–Impedance Fault Detection on Distribution Feeders", IEEE, 1997.*
Aucoin et al., "High Impedance Fault Detection Implementation Issues", IEEE, 1995.*
Li et al., "A Review of Techniques to Detect Downed Conductors in Overhead Distribution Systems", IEEE, 2001.*

* cited by examiner

*Primary Examiner*—Patrick Assouad
(74) *Attorney, Agent, or Firm*—Henry I Schanzer, Esq.

(57) ABSTRACT

In systems embodying the invention, a "downed" power line is detected by sensing whether there is an open circuit along the power line and producing an indication that an open circuit condition exists. In response to an indication that an open circuit condition exists, the system compares the nature of the voltage and/or current signals present on the power line at the time an open circuit condition is indicated to exist, with a preprogrammed stored condition which includes typical signals to be expected when a "break" occurs along a power line. When a downed power line is detected, power is then removed from the affected line.

25 Claims, 9 Drawing Sheets

SENSING DOWNED POWER LINES

This application claims the benefit of U.S. Provisional Application No. 60/145,518 filed Jul. 24, 1999 and U.S. Provisional Application No. 60/146,721 filed Aug. 2, 1999 and U.S. Provisional Application No. 60/187,258 filed Mar. 6, 2000.

BACKGROUND OF THE INVENTION

This invention relates to the detection of downed electrical power lines used to distribute power in an electrical power system and, in particular, to the control of the voltage applied to, and the current flowing through, these power lines.

Figure 1:
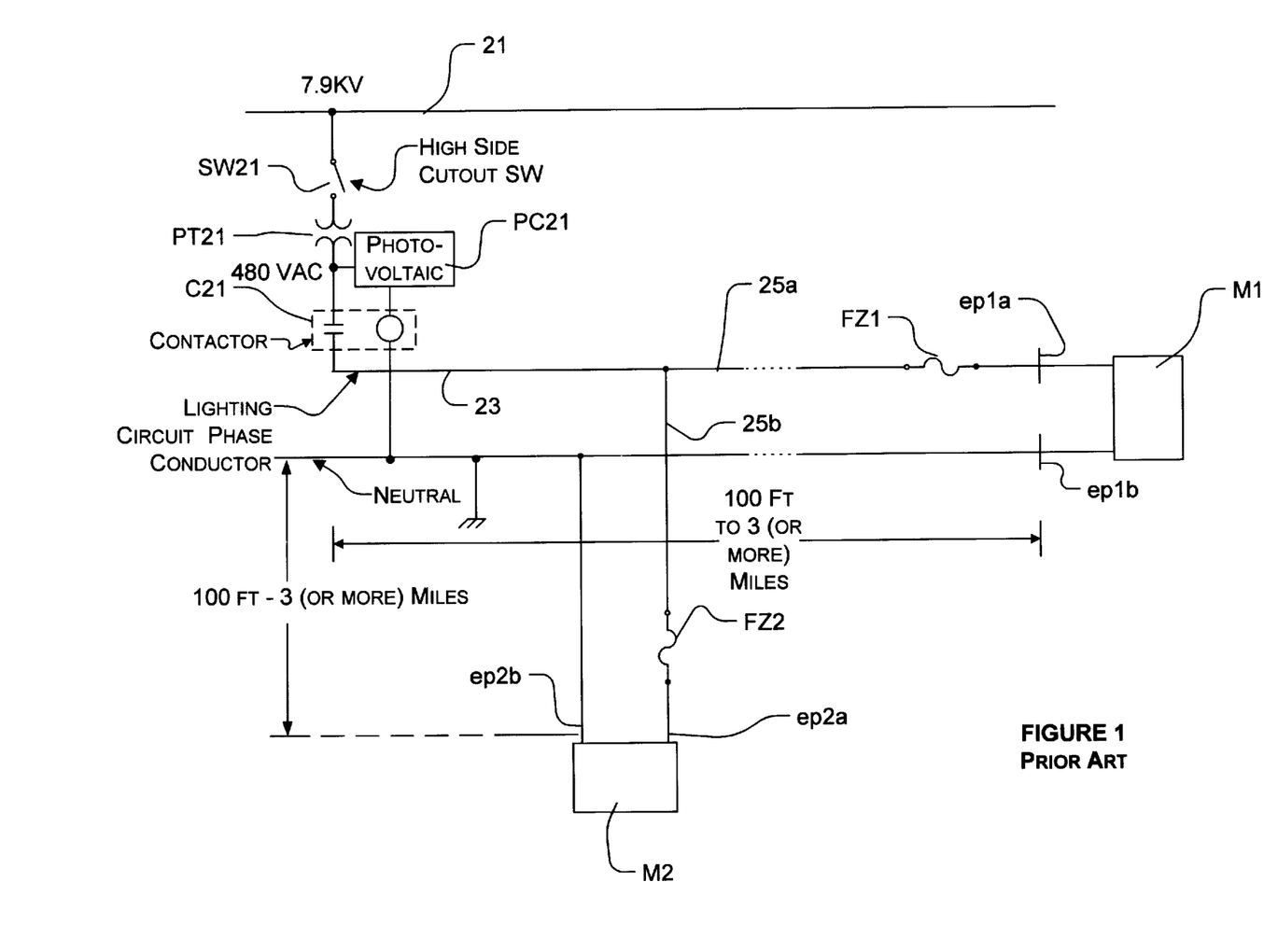
FIG. 1 is a simplified block diagram of a prior art street lighting system.

A problem which exists in detecting the nature of certain power line fault conditions will be explained with the aid of FIGS. 1 and 2. FIG. 1 illustrates a scheme for distributing power to, and along, a street lighting system. Typically the street lighting system includes a "primary" power line 21 (carrying, for example, 7.9 KV phase to ground) coupled via a disconnect switch (SW21) to the primary of a power transformer PT21. The secondary of power transformer PT21 is coupled via a contactor C21 to a power line 23 which is shown to branch off into a power line 25a and a power line 25a. Each one of the power line branches (e.g., 25a, 25b) may extend, for example, from 100 feet to 3 (or more) miles. The contactor 21 is controlled by means of a photovoltaic sensor PC21 which closes the contactor C21 at night to energize the lighting system and which opens the contactor C21 during the day to de-energize the lighting system. In addition, there are fuses (FZ1, FZ2) along lines 25a and 25b, in series with the contactor C21, which in response to an overload condition are caused to "open" or "blow" when conducting currents ranging from 10 amperes to more than 100 amperes.

Typically, the power lines 23, 25a, 25b are run above ground, supported by poles. In the event any of the poles are damaged (e.g., during a storm, as a result of an automobile accident, or mechanical failure of the supporting structure) and/or due to lightning striking the power lines and/or their supporting structure, a power line may be broken ("ruptured") resulting in a short circuit condition or in an open circuit condition. If the break is such that there is a short circuit condition, an overload current may be drawn through the power line causing a fuse (e.g., FZ1, FZ2) to blow. However, if the break is such that the power line is either dangling in the air or contacting ground via a high impedance connection, little, if any, current is drawn. The disconnect switch SW21 would not be opened and the fuses (e.g., FZ1, FZ2) along the line would not be blown. Yet, the broken ("dangling") line presents a grave danger to human life. For, if a human, or an animal, makes contact with the "dangling" broken power line serious injury or death may occur at currents as low as 0.05 amperes. Therefore, it is necessary to positively sense any "ruptured" power line; particularly when the power line is "live" in order to remove the application of power to that line.

An open circuit along a power line may be sensed via monitors (e.g., M1, M2) located at the termination (end point) of each power line (e.g., ep1a, ep1b, ep2a, ep2b). If either (or both) of the monitors (M1 and/or M2) senses that no current flows through the monitor or that there is no voltage across the lines, the monitor can indicate that there is an open circuit along the line (i.e., no power being distributed). However, the fact that there is an electric "open circuit" along a particular power line does not necessarily mean that there is a physical break ("rupture") in the power line.

Referring to FIG. 1, note that there is a fuse FZ1 along line 25a inserted into the line to protect the line and equipment (not shown) against an overload condition. This fuse (e.g., FZ1) can blow and the monitor (e.g., M1) will indicate that there is an open circuit along that line (e.g., 25a). However the fact that there is an open circuit (due to the fuse being blown) does not mean that the line is physically broken (ruptured or downed). Consequently, if, on the basis of what the monitor senses, it is assumed that the line is broken and the disconnect switch is opened, then power will be removed from line 25b as well as line 25a. This is highly undesirable since the disconnect switch controls the distribution of power to other branches and power to these branches should not be interrupted unless there is a real question of harm to human life. On the other hand, if there is a broken line, it is imperative that power to the line be removed.

The problem of detecting a broken power line has been illustrated using a "secondary" distribution system (i.e., the relatively lower voltage for the street light line distribution scheme). A similar and perhaps more significant problem exists in detecting breaks in "primary" distribution systems (i.e., those distributing high voltages) as shown in FIG. 2.

Figure 2:
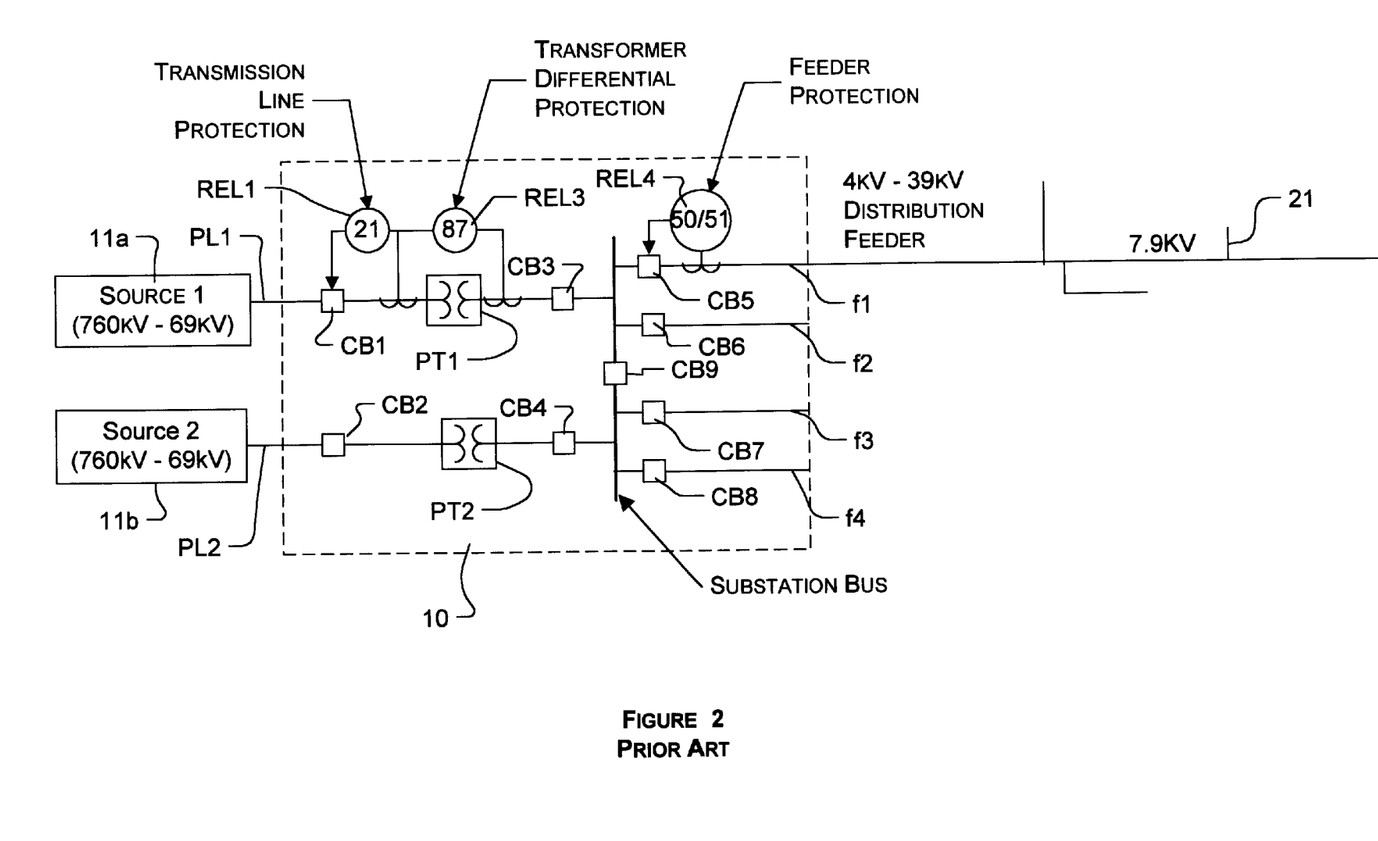
FIG. 2 is a simplified block diagram of a prior art substation based power distribution system.

FIG. 2 shows a substation 10 which is used to control the switching and distribution of electrical power from a generating source (e.g., 11a, 11b) to various distribution points and loads within a power system. Substation 10 includes a plurality of circuit breakers (e.g., CB1–CB9) which are coupled to the incoming transmission lines (e.g., PL1, PL2) and which enable the application of power to the power transformers (e.g., PT1, PT2) and to the outgoing feeders (i.e., conductors or power lines such—f1–f4). The circuit breakers are used to disconnect (and hence protect) the respective power lines and/or pieces of equipment when a fault (e.g., an overload) condition is sensed. The switching (opening and closing) of the circuit breakers (e.g., CB1–CB9) within a substation is typically controlled by protective relays (e.g., REL1–REL 4) which, by controlling the opening and closing of the circuit breakers protect the incoming transmission lines, the power transformers, the outgoing feeders as well as the circuit breakers contained within the substation.

The protective relays used in the system may be any of a number of relays, including electromechanical, non-programmable static, and programmable microprocessor based relays. Each protective relay is generally designed to sense and/or respond to a fault condition based on a plurality of settings maintained in, or applied to, each relay. When a relay senses a fault condition it causes its associated circuit breaker(s) to interrupt the power to, or out, of the device(s) being protected.

As noted above, if a relay senses loss of power along one line and interprets the loss as a broken or downed line, power may be removed from lines servicing users who may suffer significant economic damage due to the power interruption. If, in fact, the loss of power is due to a broken line which is "live", then the potential harm to life warrants the interruption of power distribution. However, if the loss of power is due to a blown fuse, then the disruption of power distribution is not warranted, Thus, when an open circuit condition is sensed, a problem exists in detecting whether the sensed open circuit is due to the line being broken and requiring additional removal of power, or to another cause (e.g., an open relay or a blown fuse) requiring no additional action.

SUMMARY OF THE INVENTION

The distribution of power along a power line may be interrupted by among others, a physical break (rupture) of the power line, the blowing of a fuse along the power line or the opening of a disconnect switch. Interruption of power distribution results in the interruption of current flow and in the absence of a voltage beyond the point where the power line is broken or the fuse is blown or the disconnect switch is opened. Applicant's invention resides, in part, in the recognition that different conditions causing interruption in the power distribution provide different "signatures". For example, the characteristics of the voltage, current and power signals and their transient responses generated on a power line resulting from a rupture of the power line are different than the voltage, current and power signal characteristics generated and sensed due to the blowing of a fuse or the opening of a disconnect switch or a circuit breaker. The different responses generated (and sensed) represent different signatures ("characteristics") which may be used to positively identify the cause of a power interruption (e.g., whether it is due to a break in a power line).

Applicant's invention also resides in the sensing of any disruption in the distribution of power along a power line and in sensing the signature of the signal on the power line at the time of the disruption of power, prior to opening a circuit breaker supplying power to that line.

An electrical power distribution system embodying the invention includes a first storage means for storing information pertaining to selected characteristics exhibited by a downed power line. The system also includes circuitry coupled to a power line for sensing selected characteristics of the power being distributed along the power line and for storing the sensed information in a second storage means. The system also includes circuitry coupled to the power line for sensing the presence of an open circuit on the power line and, when an open circuit condition is sensed, comparing information stored in the second storage means with information stored in the first storage means to determine whether the open circuit is due to a break in the power line.

Circuits embodying the invention include means for continuously sensing and monitoring the presence of power at the termination point of a power line and for communicating this condition to a receiver at the origination point of the power line. Whenever there is a loss of power, a signal condition indicative of power loss is generated. In accordance with the invention, at least one of the voltage, current and energy (power) characteristics present at the origination point of the power line is sensed and monitored. When a power loss signal is generated, the nature of at least one of the voltage, current and energy characteristics at the origination point of the power line at the time of the power loss is examined to determine whether a physical beak along the power line has occurred and to then trip (or open) the appropriate circuit breaker, sectionalizer, recloser, disconnector, or contactor and to do so quickly, securely and dependably.

The origination point of a power line as used herein and in the appended claims may be located at the transmission or distribution substation, or at a contactor controlling a street lighting circuit or at a switching point along the power distribution line such as a recloser, sectionalizer, or disconnector. An origination point may also be the physical area on a power line to which power is applied for subsequent distribution along the power line, or branches thereof. The termination point of the power line need not be the actual physical end of a line, but may include any point, or section, along the power line remote from the origination point.

In one embodiment of the invention, a first communication device is coupled to an origination point of a power line and a second communication device is coupled to a contact point along the power line between the origination point and a termination point of the power line; where the first and second communication devices can communicate with each other over the power lines by sending and receiving encoded messages. Whenever the distribution of power is disrupted between the origination and the contact points, a disrupt signal is produced indicative of the interruption and a possible break in the power line. In response to a disrupt signal, the first communication device inspects at least one of the various voltage, current and energy measurements made at the time of, or just prior to, the generation of the disrupt signal to determine whether the power line is indeed broken.

Where the power line has one origination point and several different termination points, due to branching of the power line, additional communication devices may be connected to each termination point, with each one of these second communication devices sending out a unique address for enabling the system to identify the affected power line segment.

BRIEF DESCRIPTION OF THE DRAWINGS

In the accompanying drawings like reference characters denote like components.

DETAILED DESCRIPTION OF THE INVENTION

Figure 3:
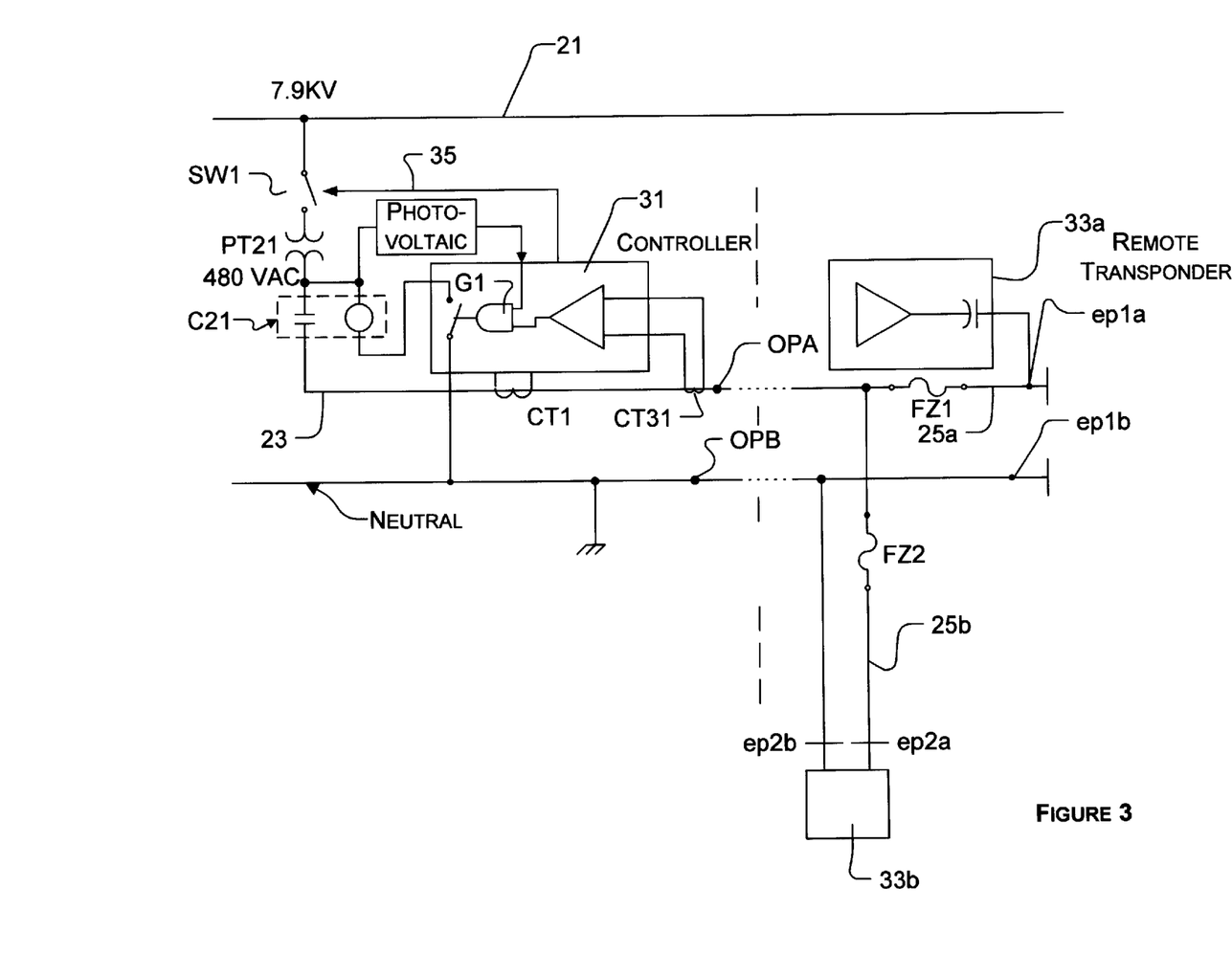
FIG. 3 is a simplified block diagram of a street lighting system embodying the invention.

A highly simplified power distribution system embodying the invention is shown in FIG. 3 and illustrates how the prior art systems of FIGS. 1 and 2 would be modified in accordance with the invention. The system of FIG. 3 includes: (a) a microprocessor based controller 31 located and connected at, or near, the origination point (OPA, OPB) of power line 23; (b) a microprocessor based remote transponder 33a which is shown located and connected at, or near, a selected termination point (ep1a, ep1b) of the power line branch 25a and another microprocessor based remote transponder 33b which is shown located and connected at, or near, a selected termination point (ep2a, ep2b) of the power line branch 25b; and (c) additional controls from the controller 31 responsive to a fault detection and from the photovoltaic cell applied to a logic gate G1 to control contactor C21; and (d) a control line 35 from controller 31 for controlling the disconnect switch SW1.

Note that, in FIG. 3 (and in FIGS. 5 and 6), a single power line is shown for ease of illustration. However, it should be understood that this is for purpose of illustration only and that the invention is intended for use with power distribution along multi-phase power lines carrying more than one phase in a "WYE" or "DELTA" configuration.

In the system of FIG. 3, the remote transponders 33a and 33b include circuitry for continuously sending messages encoded with their unique address identifying transponders 33a and 33b and the respective phases of the power line, 23, 25a and 25b, to which they are connected. Transponder 33a sends its uniquely encoded messages along the power line 23–25a back to controller 31 and transponder 33b sends its uniquely encoded messages along the power line 23–25b back to controller 31. Each one of transponders 33a and 33b may be a power line transceiver (such as the PLT-22 made by Echelon Corp., or any similar device) capable of transmitting information such as data signals onto a power line carrying AC power at a relatively low frequency (e.g., 60 Hz). The transponders 33a, 33b may be capacitively coupled or indirectly coupled to three respective power lines. In systems embodying the invention, the actual speed of a transmission is not significant so long as the carrier frequency is not a multiple harmonic of 60 Hz.

Figure 4:
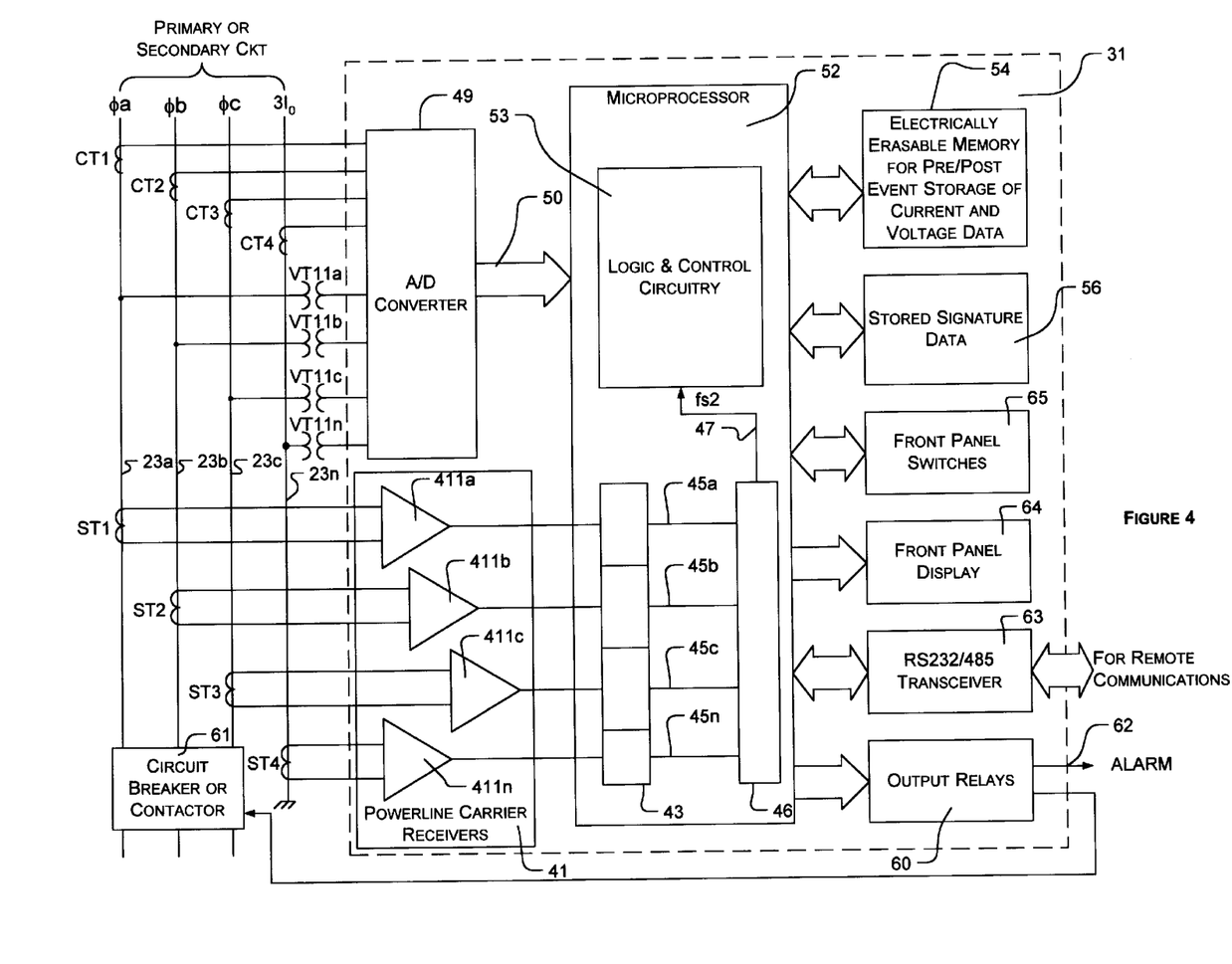
FIG. 4 is a block diagram of a controller for use in the system of FIG. 3.
Figure 4A:
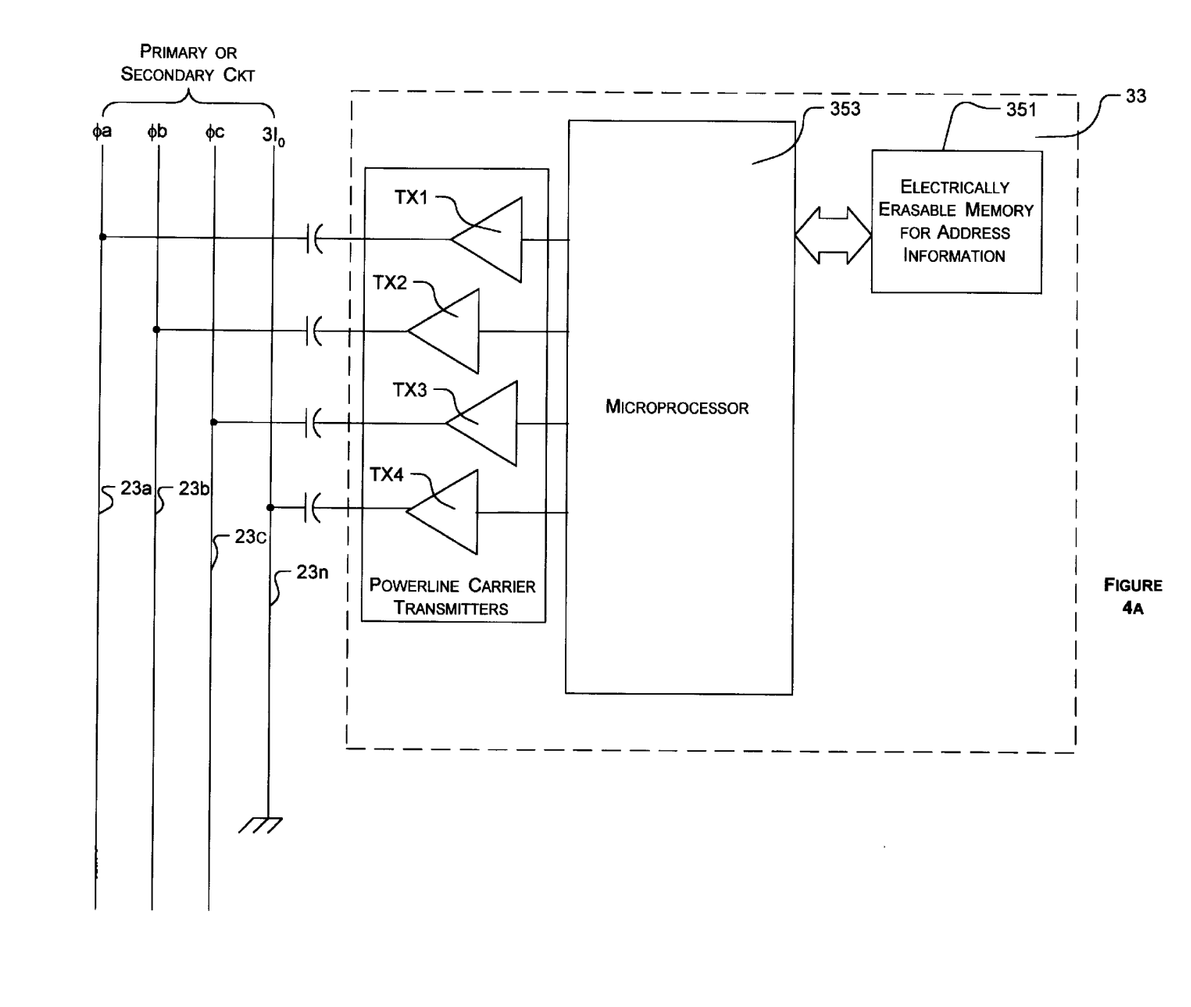
FIG. 4A is a block diagram of a part of a transponder for use in the system of FIG. 3.

FIG. 4A is a simplified block diagram of a microprocessor (353) based transponder (33) including a memory (351) for, among others, generating a unique address code identifying the transponder. The processor 353 generates Signals which are applied to four transmitters (TX1–TX4), one transmitter for each of three power lines and one transmitter for the neutral. The outputs of the transmitters are shown to be capacitively coupled onto the power lines 23a, 23b 23c and 23n (the neutral also denoted as $3I_0$) which can carry the transmitter signals along the lines to a controller such as controller 31 to an origination point.

Controller 31 includes circuitry for receiving and decoding the information being inputted on the power line by transponder 33. The operation of controller 31 and the processing of information received from the transponders 33a, 33b may be better explained with reference to FIG. 4. As shown in FIG. 4, controller 31 includes a power line carrier receiver section 41. For a 3 phase system the carrier receiver 41 would have four receivers (411a, 411b, 411c and 411n), one for each phase and one for the neutral line, with each receiver being coupled by a respective sensing transformer (ST1, ST2, ST3, ST4), one for each phase and one for the neutral, to its respective power line (23a, 23b, 23c and $3I_0$). Systems embodying the invention may include a powerline carrier receiver 411n for the neutral line. It is important to monitor the neutral line (as well as the other power lines) because if the line breaks, it may become "hot" and dangerous. The sensing transformers (ST1–ST4) and the power line carrier receivers 41 of controller 31 are designed to sense and receive the information inputted onto the power lines by remote transponders such as 33a and 33b. The outputs of receivers 411a, 411b, 411c and 411n are fed to a detector circuit 43 which is used to detect the presence or absence of power at the remote transponders 33a, 33b. In FIG. 4, the detector circuitry may be located within a microprocessor 52. However, detector circuit 43 could be separate from the microprocessor 52. The system of FIG. 3, including the circuitry of FIG. 4, is configured such that communication between the transponders 33a, 33b and the controller 31 is along the power lines and the neutral line. If at any time there is an open circuit condition along their respective power and/or neutral lines, the messages from the remote transponders (e.g., 33a, 33b ) are interrupted and receivers 411a, 411b, 411c, 411n do not receive information from their corresponding transponders down the line. The open circuit condition is communicated immediately upon its occurrence. Whenever a receiver fails to receive a signal from its corresponding remote transponder, the receiver produces a fault condition at its output and detector 43 then produces a corresponding fault signal, fs, condition at its output, 45a, 45b, 45c, 45n indicative of the interruption of conductivity (i.e., an open circuit condition) along a power (or neutral) line. Thus, whenever there is an interruption in the power distribution (i.e., an open circuit condition) along a power line between an origination point (e.g., OPA) and a remote transponder (e.g., 33a, 33b ), a fault signal is generated at the output of a detector circuit 43 which is then coupled to a control circuit 46, which supplies a fault signal indication via a line 47 to logic and control circuitry 53 in microprocessor 52.

As shown in FIG. 4, controller 31 also includes an A/D converter 49 which receives signals from current transformers (CT1, CT2, CT3, CT4) for sensing and measuring the current waveforms present on the power lines, 23a, 23b, 23c and $3I_0$ (the neutral) at the origination point (e.g., OPA). The A/D converter in controller 31 also receives signals from voltage transformers (VT11a, VT11b, VT11c and VT11n) for sensing the voltage waveforms present on the power lines, 23a, 23b, 23c, 23n, at the origination point (e.g., OPA). The outputs of the current and voltage transformers are applied to analog-to-digital (A/D) converter 49 which functions to sample, at a predetermined rate, the current and voltage information present at the origination point. In this embodiment, voltage and current are sensed. However, it should be understood that, in addition to (or instead of) the measurements shown, the power or other characteristic, including any transient response at the origination point, could be measured.

The various outputs 50 of the A/D converter 49 are constantly fed to microprocessor 52 which processes the data via logic and control circuits 53 (or via additional circuitry) and stores the information in a memory 54. Memory 54 may be an erasable memory which is continuously updated with information pertaining to the nature (characteristics) of the electrical signals present on the power line. Memory 54 is selected to be sufficiently large so as to store sufficient information to enable the determination of the characteristics of the power signals on the power lines 23a, 23b, 23c and the neutral $3I_0$ when a fault occurs. Whenever there is an interruption of power distribution (i.e., an open circuit condition) on a power line or on the neutral, a fault signal (fs2) from detector and control circuitry (43,45, 46) is fed via line 47 to logic circuitry section 53 located in processor 52. The fault signal (fs2) may include information as to the time of the power disruption. In response to the fs2 fault signal, the information stored in memory circuit 54 is then retrieved and evaluated by microprocessor 52. The evaluation may include comparing the information stored in memory 54 with signature data stored in a memory 56. The information in memory 56 may include stored signature data describing the characteristics of the signals to be expected on a power line when there is a break in the line or when a fuse blows or when a circuit breaker is opened. Memory 56 may be as read-only-memory (ROM) or any suitable memory circuit which may be part of microprocessor 52 or a stand alone memory component contained within controller 31. The information stored in memory 56 may then be used as a standard to determine whether, or not, the interruption of power reported by the fault signal is due to a break in the power line. Thus, upon receipt of an fs2 fault signal, microprocessor 52 compares the measured information stored in memory 54 with preprogrammed information stored in memory 56. If the comparison indicates that the measured information is similar to the characteristics of a broken line, then the controller supplies a signal to interrupt the application of power to the "broken" line. In FIG. 3, an interrupt signal may be supplied via line 35 to SW1 and/or via gate G1 to contactor C21. In FIG. 4, an interrupt signal is applied to output relays 60 which then supply a signal to trip (open) a circuit breaker or disconnect switch or contactor 61. The processor 52 may also provide signals to: a) close a relay to sound an alarm 62; b) communicate via transceivers 63; c) provide signals for a front panel display 64 located in a local or remote substation; and d) interface with front panel switches 65.

Thus, systems embodying the invention include a controller (e.g., 31) which includes means for accessing preprogrammed "characteristic" information (e.g., stored signature data 56) describing certain voltage/current/power characteristics generated on a power line when a power line ruptures. The memory circuitry 56 may also be preprogrammed to include the characteristics generated when other events occur, such as a blown fuse or a circuit breaker is opened, or a short circuit has occurred. Memory 56 may be part of controller 31 or may be part of a central system memory storage used by an electrical power utility. Systems embodying the invention also include circuitry (e.g, A/D 49) for continuously sensing what is happening on a power line and for recording the information in an erasable memory (e.g., 53, 54) located within the controller or which the controller may readily access. Whenever a fault condition is sensed on a power line and that fault condition is communicated to the controller, the controller is programmed to compare the information generated on the power line at the time the fault condition occurs, or just prior thereto, with the preprogrammed information stored in memory to determine more accurately the nature of the fault and what action to take.

Figure 5:
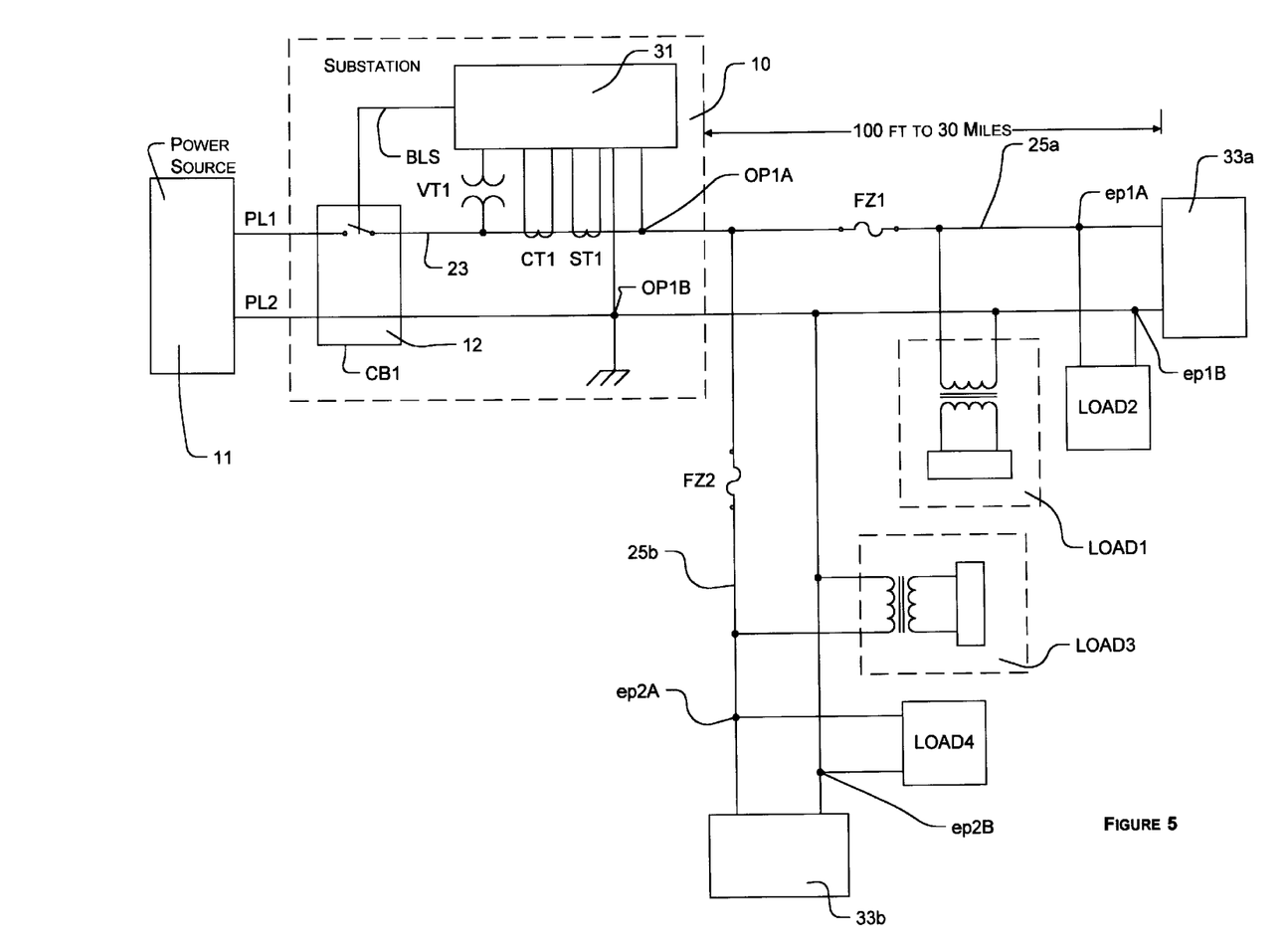
FIG. 5 is a simplified block diagram of a substation based power distribution system embodying the invention.

The invention has been illustrated in FIG. 3 for what is termed a "secondary" circuit; e.g., the secondary of VT21 may be a 480 volts, 60 Hz A.C. signal. However, it should be evident that the invention is equally applicable for use in "primary" circuits. This may be illustrated with reference to FIG. 5, which is a highly simplified block diagram of part of an electric power distribution system including a substation 10. FIG. 5 shows a power source 11 supplying power to power line PL1 and to the neutral line PL2. The power lines are coupled to a circuit breaker, CB1, which when enabled, couples power onto one output power line 23 which is then shown to branch off into a power line 25a and a power line 25b. In practice, a substation would typically have many more power lines than the two output lines, shown in FIG. 5, for distributing power along a power grid. Obviously, each power line PL1 may include more than one phase.

Systems where the power line is referenced to neutral have been shown. However, it should be clear that the invention also applies to ungrounded (DELTA) power system.

Power line PL1 passes through circuit breaker CB1 and is then denoted as line 23. Line 23 is divided into two branches. One branch includes line 25a for distributing power along a first path to a first transformer coupled load, Load 1, and to a second load, Load 2. Another branch includes line 25b for distributing power along a second path to a transformer coupled load, Load 3, and to a fourth load, Load 4. Each path may include fuses along its power lines (e.g., FZ1, FZ2) to protect the lines against excessive short circuit conditions. At selected termination points, which may be at, or near, the physical end of each branch there is placed a transponder 33a, 33b to sense the line voltage and the line current as discussed in FIGS. 3 and 4, above.

Transponders 33a and 33b communicate with a receiver in controller 31 via their respective power lines. Each transponder provides coded information which includes information uniquely identifying the unit. Therefore, when there is an interruption in the power distribution along one of the branch lines, the controller 31 can readily identify which line is without power. After recognizing the loss of power along a power line the controller 31 then determines whether the loss of power is due to a break (rupture) in the power line or due to a blown fuse by evaluating the characteristic of the voltage/current on the power line at the origination point at the time of the reported power loss. If the loss of power is due to a break in any one of the power lines the controller supplies a signal to the circuit breaker CB1 disconnecting the power line 23 form the power source Within the substation 10, which defines the origination point for the output power line 23–25a and 23–25b, there is provided a controller 31 which would function in a similar manner to controller 31 describes in FIGS. 3 and 4, above. The controller 31 includes: (a) voltage and current sensing circuitry (e.g., ST1) coupled to the power lines 23 for sensing any interruption in the voltage and/or current between the origination point (OP1A, OP1B) of the power line 23–25a and 23–25b and the termination point (ep1a, ep1b, ep2a, ep2b) of the power lines 25a and 25b; (b) circuitry (VT1, CT1) for sensing the voltage and/or current waveform at the origination point, at each instant of time, and for continuously sampling and recording the information being sensed; and (c) memory circuitry in which there is prestored information which includes, for example, the characteristics of the voltage and/or current when a power line is broken or other like characteristics.

The controller 31 circuitry senses an interruption in the power distribution by being in virtually constant communication with remote transponder 33a, 33b. If and when the controller 31 senses the interruption of power along any of the power lines, a fault signal is immediately produced which triggers a search of the memory circuitry to compare the current and/or voltage characteristics it has sensed and stored with the prestored information. If the prestored information, indicative of a broken line condition, corresponds to the sensed information, a broken line signal is produced which is applied to the circuit breaker CB1. CB1 is then opened and the power line 23 is disconnected from the power source 11 at the substation. When CB1 Is opened, power is removed from Loads 1, 2, 3 and 4. This represents a substantial disruption in power distribution along the grid, which is only warranted to avoid danger to human life.

Thus, in systems embodying the invention, a first communication unit at an origination point is in constant communication with a second communication unit, at a selected point (remote from the origination point) to determine if and when there is an interruption in the power distribution between the two points and to produce a first fault signal when an interruption is sensed. Concurrently, the system includes means for sensing and storing the characteristics of the voltage/current signals being generated at the origination point. If and when a first fault signal is produced, the first communication unit, in response thereto, compares the stored characteristics of the voltage and/or current signals at the time the first fault signal is generated with preprogrammed information characteristic of a broken power line condition to determine whether, or not, the sensed and stored information corresponds to certain pre-programmed information. If there is correspondence, the circuit breaker (or disconnect switch) is opened, removing the application of power.

Figure 6:
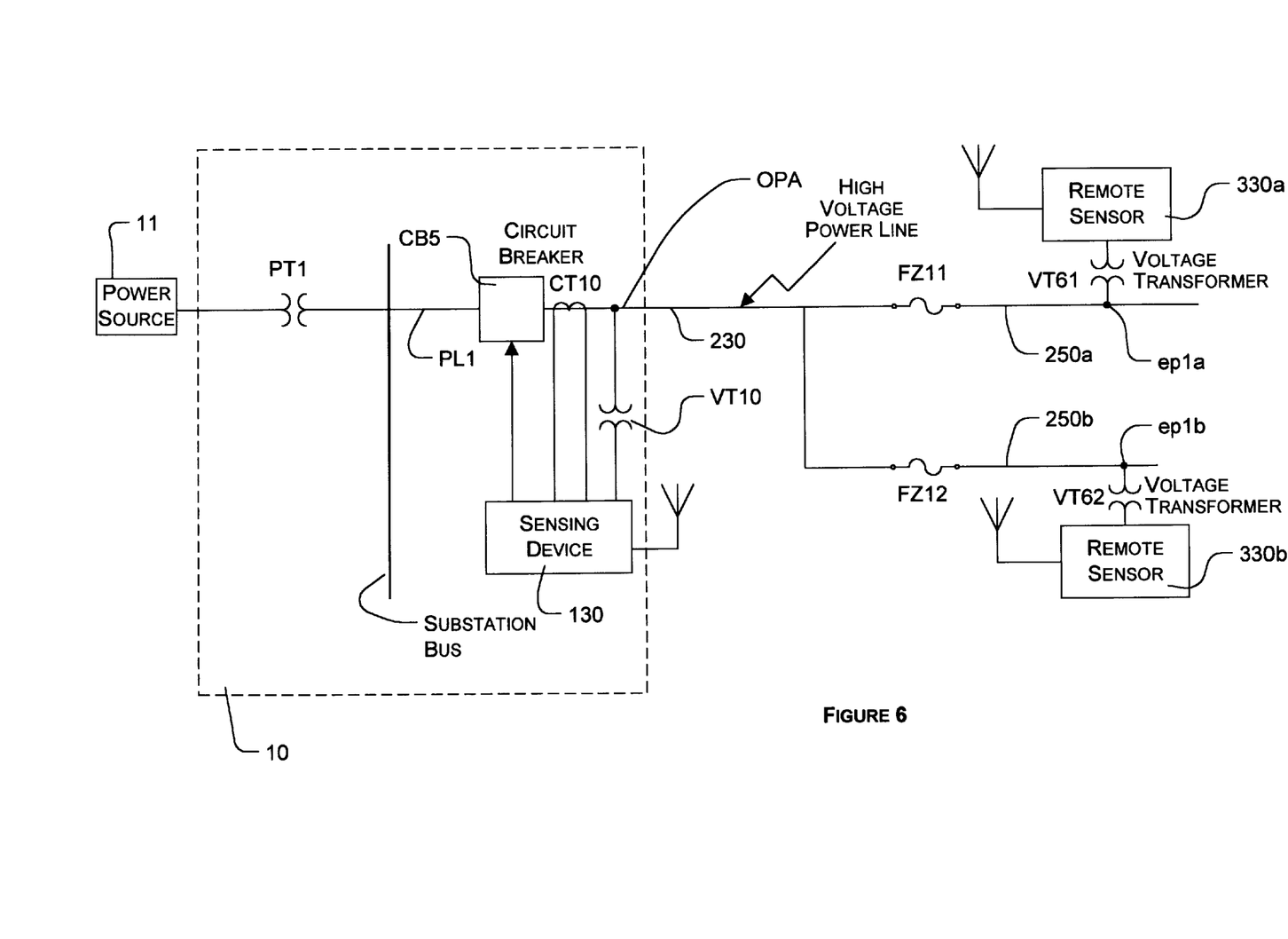
FIG. 6 is a simplified block diagram of a system embodying the invention.

FIG. 6 illustrates a system embodying the invention in which the existence of a loss of power (along a power line or a neutral) is communicated by radio transmission between a remote sensor 330a, 330b and a sensor 130 located within a substation 10. A power source 11 is couple via a power transformer PT1 to a circuit breaker CB5, which when enabled, couples the power line PL1 to an output feeder 230. The current on line 230 is sensed by a current transformer CT10 and the voltage on line 230 is sensed by a voltage transformer VT10. The outputs of CT10 and VT10 are supplied to an A/D converter (not shown) contained within device 130 which functions in a similar manner to the A/D converter 49 shown in FIG. 4 and discussed above. FIG. 6 differs from the system discussed in FIGS. 3, 4, and 5 in that communication between an origination point (OPA) and remote points (e.g., ep1a, ep1b) along the power distribution grid is by a radio link, rather than via conduction along the power line conductors.

Figure 8:
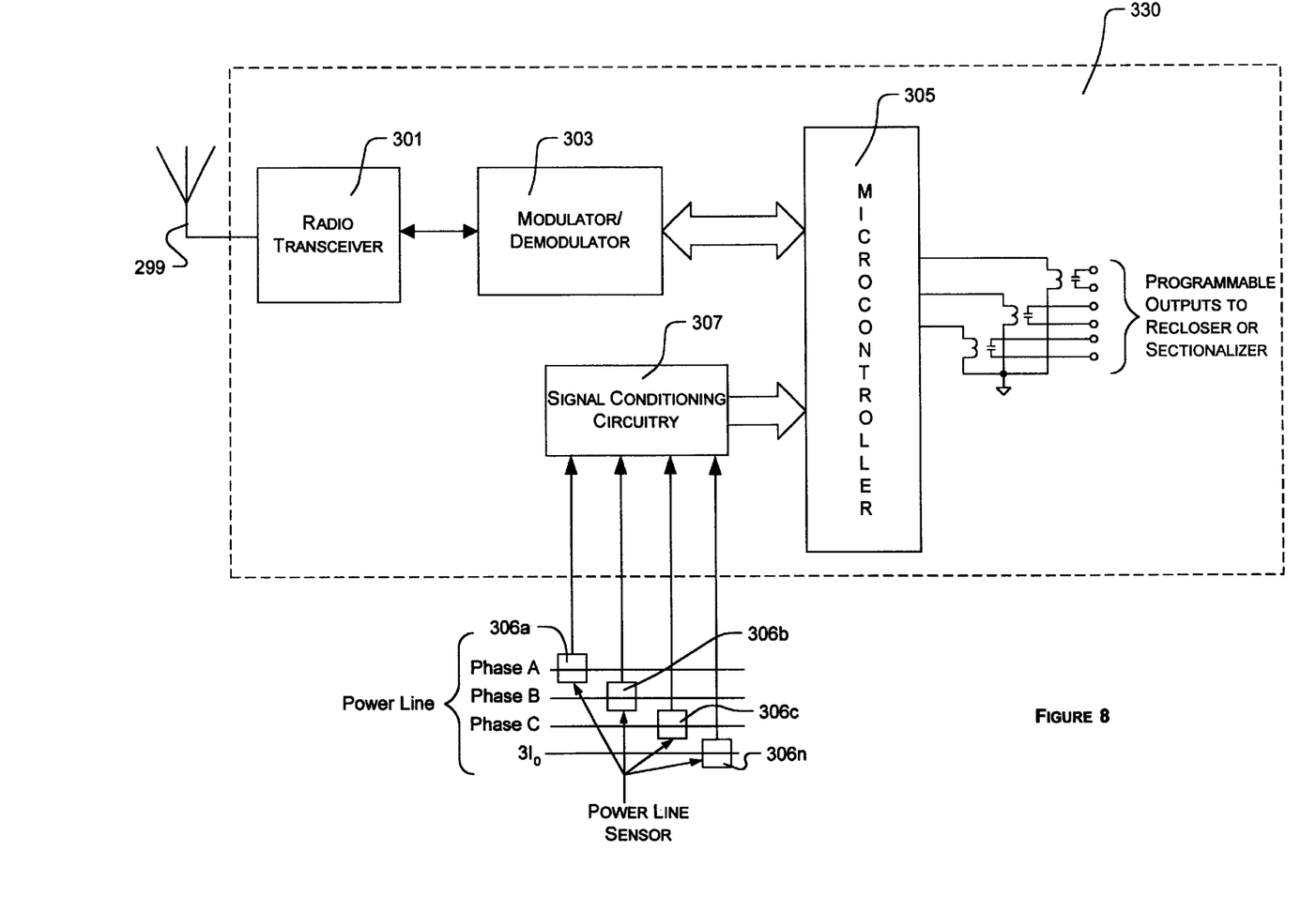
FIG. 8 is a block diagram of a transceiver for use in the system of FIGS. 6 and 7.

Power line 230 branches into a power line 250a which includes a fuse FZ11 and a second branch 250b which includes a fuse FZ12. At a selected point, ep1a, along line 250a a voltage transformer VT61 couples power line 250a to a remote device 330a and at a selected point, ep1b, along line 250b a voltage transformer VT62 couples power line 250b to a remote device 330b. As shown in FIG. 8, each one of remote devices 330 (i.e., 330a or 330b) includes circuitry (306a, b, c and n) for sensing at least one of the voltage, current or electric field on its associated power line (e.g., phase a, b, c and the neutral $3l_0$). Each one of remote devices 330a and 330b also includes circuitry 307 for converting the analog signals into digital quantities. Each one of devices 330a, 330b also includes a microprocessor 305 and/or other suitable digital processing circuitry to process the digital quantities representing the voltage, current or electric field of its associated power line to ascertain (i.e., sense) when there is a loss of power at its location. When one of devices 330a, 330b senses a loss of power at its location, it sends a signal via a modulator 303 and radio transceiver 301 and antenna 299 to sensing device 130 (See FIG. 6) located at the substation. Each one of devices 330a and 330b may also include circuitry within microprocessor 305 for encoding and decoding signals to be sent to and from device 130 in substation 10 in a secure and dependable fashion. Each one of the remote devices 330a and 330b, may also be used to send information regarding the measured voltage, current or electric field on a regular or selected basis to substation 10 and/or to any other point of interest. In FIG. 8 devices 330 are shown to include circuitry (301, 303) for modulating the signals it generates and for sending the signals via radio antenna 299. However, it should be understood that a telephone or a fiber optic transceiver could be used instead. Each one of devices 330a and 330b may also includes circuitry 301,303 for receiving and demodulating signals received from the substation or any other facility. The remote sensors 330a, 330b may also be programmed to control output devices such as a dry contact relay or a solid state switch for the purpose of locally controlling reclosing and sectionalizing devices.

Figure 7:
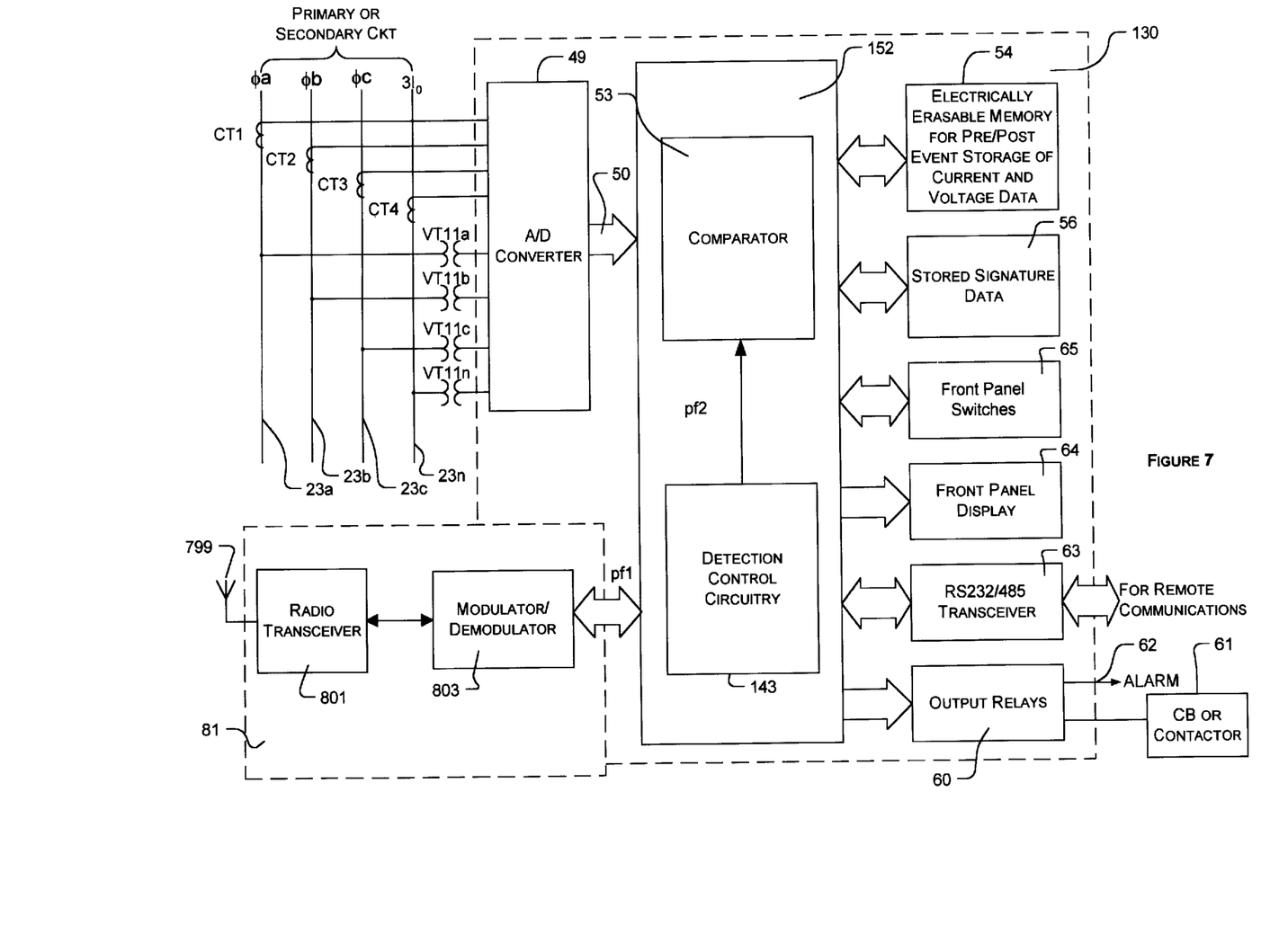
FIG. 7 is a block diagram of a controller and communications system for use in the system of FIG. 6.

The sensing device 130 in substation 10 may be as shown in FIG. 7. Device 130 is similar to controller 31, shown in FIG. 4, except that the power line carrier receivers are replaced with a communications section 81 which includes a radio transceiver 801 and a modulator/demodulator 803. The output of modulator/demodulator 803 is coupled to detection and control circuitry 143 of a microprocessor 152. The sensing and sampling of the voltage and/or current on the power lines and on the neutral and the processing of the information may be done on a continuous basis, as discussed above for FIG. 4, and the information stored in memory 54 is continuously updated, as discussed for FIG. 4 above.

When a signal is received by communication sections 81 from a remote sensor (i.e., 303a and/or 303b) indicating that there is a power loss, a first signal, pf1, is generated indicative of the power failure. This signal, pf1, is fed to a control section 143 of microprocessor 152 which then generates a corresponding fault signal pf2 which is applied to a comparator section 53 of the processor 152 which may function similarly to section 53 in FIG. 4. The processor 152 then examines the information sensed on the power line at the origination point (as discussed above for FIGS. 3, 4, 5 and 6) at the time the fault signal is produced and compares the sensed information stored in memory 54 for storing pre/post event storage of current/voltage data versus pre-programmed information in stored signature data memory 56. As discussed above, memory 56 contains pre-stored and/or pre-programmed data as to the nature of signals to be expected when there is a fault (such as a broken line). Memory 56 may be part of the controller 130 or it may be part of a data storage located in another part of the electric power distribution system. The processor 152, like processor 52, then determines whether the sensed current/voltage on the power line at the origination point corresponds to the "signature" of a broken line. If it does correspond, processor 152 causes the removal of power to the affected line or lines. The removal of power may be achieved, for example, by opening appropriate circuit breakers (e.g., CB5 in FIG. 6) or any other switching device. Otherwise, controller 130 produces signals similar to those described above for processor 52 and controller 51.

What is claimed is:

1. Apparatus for sensing a break along a power conductor which is used to distribute electrical power from an origination point and then along the conductor to a termination point, comprising:

a first means coupled to the origination point of the conductor;

a second means connected to a point along the conductor between the origination point and the termination point of the conductor; said first and second means being in communication with each other for producing a first signal when there is an interruption in the distribution of power along the conductor between the first and second means; and sensing and recording means coupled to the origination point of the conductor for sensing and recording the characteristic of the electrical signals present at, or reflected to, the origination point of the conductor for enabling said sensing and recording means to sense and record the electrical signal present at the origination point at all times, including the time when the first signal is produced.

2. Apparatus as claimed in claim 1, wherein a power source is coupled to the origination point of the conductor via a power switching device, and wherein when the electrical signals sensed along the conductor at the time of the disruption of communication between the first and second communication means correspond to the prerecorded signals to be expected when a break occurs along a conductor, the power switching device is operated so as to interrupt the coupling of the power source to the conductor.

3. Apparatus as claimed in claim 2, wherein the power source is an alternating current (AC) power source.

4. Apparatus as claimed in claim 1, wherein said first and second means communicate with each other along said conductor whereby any open circuit condition along the conductor causes the interruption of communication between the first and second means.

5. Apparatus as claimed in claim 4, wherein the first means includes signal receiving circuitry; and wherein the second means includes means for sensing the presence of electrical power being distributed along the conductor and also includes transmitting circuitry for sending coded messages along the conductor to the signal receiving circuitry of the first means located at the origination point.

6. Apparatus as claimed in claim 4, wherein at least one of said first and second means generates said first signal in response to the interruption of communication between the first and second means and wherein said first signal is applied to said sensing and recording means for evaluating the characteristic of the electrical signal generated at the origination point at the time of the interruption of communication along the conductor.

7. Apparatus as claimed in claim 6 wherein said sensing and recording means also includes memory means for storing pre-recorded characteristic information of the electrical signal to be expected at the origination point when disruption of power along a conductor occurs, including the electrical signal to be expected at the origination point when a break occurs along a conductor; and wherein said first signal causes the electrical signal sensed at the time of the disruption of communication between the first and second communication means to be compared to said prerecorded information.

8. Apparatus as claimed in claim 7 wherein the sensing and recording means includes analog-to-digital (A/D) converter circuitry and wherein said first and second means are each capable of at least doing one of transmitting and receiving signals.

9. Apparatus as claimed in claim 1 wherein a first transceiver is coupled to the origination point of the conductor and a second transceiver is coupled to the termination point of the conductor; said first and second transceivers being in communication with each other for producing a first signal when there is a disruption in the distribution of power along the conductor.

10. Apparatus as claimed in claim 9 wherein said first and second transceiver communicate with each other via radio signals.

11. Apparatus as claimed in claim 9 wherein said recording means to sense and record the electrical signal present at the origination point at all times includes a first memory circuit in said first transceiver and wherein said first transceiver also includes a second memory circuit for storing pre-recorded characteristic information of the electrical signal to be expected at the origination point when disruption of power along a conductor occurs.

12. An electrical power distribution system comprising:
first storage means for storing information pertaining to selected characteristics exhibited by a downed power line;
circuitry coupled to a power line for sensing selected characteristics of the power being distributed along the power line and for storing the sensed information in a second storage means;
circuitry coupled to the power line for sensing the presence of an open circuit on the power line; and
circuitry responsive to the presence of an open circuit condition for comparing information stored in the second storage means with information stored in the first storage means.

13. A system as claimed in claim 12 wherein said circuitry responsive to the presence of an open circuit condition for comparing information stored in the second storage with information stored in the first storage means also includes circuitry for producing a signal indicating whether the information sensed and stored in the second storage means corresponds to characteristics exhibited by a downed power line.

14. A system as claimed in claim 13, wherein said power line has an origination point and a termination point; and
wherein said circuitry coupled to a power line for sensing selected characteristics of the power being distributed along the power line and for storing the sensed information in a second storage means includes a first circuit coupled to the origination point of the power line;
wherein said circuitry coupled to the power line for sensing the presence of an open circuit on the power line includes a second circuit connected to a point along the power line between the origination point and the termination point and wherein said first and second circuits being in communication with each other for producing a first fault signal when there is an interruption in the distribution of power along the power line; and
wherein the circuitry responsive to the presence of an open circuit condition for comparing information stored in the second storage means with information stored in the first storage means produces a signal interrupting the application of power to the origination point if the signal stored in the second storage means corresponds to the signature of a downed power line.

15. Apparatus for sensing a break along a power conductor which is used to distribute power from an origination point and then along the conductor to a termination point, comprising:
first communication means coupled to the origination point of the conductor; second communication means connected along the conductor between the origination point and the termination point of the conductor; said first and second communication means communicating with each other along said conductor, whereby any open circuit condition along the conductor causes the interruption of communication between the first and second means;
sensing and recording means coupled to the origination point of the conductor for continuously sensing and recording selected characteristics of the electrical signals present at, or reflected to, the origination point of the conductor; wherein at least one of said first and second communication means generates a first signal in response to the interruption of communication between the first and second communication means and wherein said first signal is applied to said sensing and recording means for evaluating the characteristic of the electrical signal generated at the origination point at the time of the interruption of communication along the conductor.

16. Apparatus as claimed in claim 15 wherein said sensing and recording means also includes memory means for storing pre-recorded characteristic information of the electrical signal to be expected at the origination point when disruption of power along a conductor occurs, including the electrical signal to be expected at the origination point when a break occurs along a conductor; and wherein said first signal causes the electrical signal sensed at the time of the disruption of communication between the first and second communication means to be compared to said prerecorded information.

17. Apparatus as claimed in claim 16, wherein a power source is coupled to the origination point of the conductor via a switching means, and wherein when the signals sensed at the time of the disruption of communication between the first and second communication means are comparable to the prerecorded signals to be expected when a break along a conductor occurs, a signal is produced and applied to the switching means for interrupting the coupling of the power source to the conductor.

18. Apparatus comprising:
    a conductor having an origination point and a termination point;
    a power source;
    a normally enabled switching means connected between the power source and the origination point of the conductor; said switching means, when enabled, coupling the power source to the origination point of the conductor for enabling distribution of power along the conductor;
    a first transceiver coupled to the origination point of the conductor; a second transceiver coupled along the conductor between the origination point and the termination point; said first and second transceivers being in communication with each other for producing a first signal when there is a disruption in the distribution of power along the conductor;
    sensing and recording circuitry coupled to the origination point of the conductor for sensing and recording selected electrical signals generated at the origination point of the conductor for disabling the switching means in response to a predetermined signal condition at the origination point and to the presence of said first signal.

19. Apparatus as claimed in claim 18 wherein said predetermined signal condition corresponds to a signal which is normally produced when a conductor is physically ruptured.

20. Apparatus as claimed in claim 18 wherein said first and second transceivers communicate with each other along the conductor.

21. Apparatus as claimed in claim 18 wherein said first and second transceivers communicate with each other via a radio link.

22. A method for interrupting power distribution along a power line comprising the steps of:
    sensing selected characteristics of the power being distributed along a power line and storing the information in a first memory;
    sensing the presence of an open circuit condition on a power line;
    comparing information corresponding to selected ones of the characteristics stored in the first memory with prestored data identifying characteristics exhibited when there is a break on the power line, in response to sensing the presence of an open circuit on the power line; and
    interrupting the application of power to the portion of the power line before the break.

23. A method as claimed in claim 22, wherein said power line has an origination point to which power is applied and a termination point; and wherein the step of sensing selected characteristics of the power distributed includes circuitry for sampling the selected characteristics at the origination point.

24. A method as claimed in claim 22, wherein the step of sensing the presence of an open circuit condition on a power line includes the connection of a first communication means at the origination point and a second communication means at a point along the power line between the origination point and the termination point.

25. A method as claimed in claim 22, wherein the step of comparing information includes the step of pre-recording and storing in a data storage circuit the pre-stored data identifying characteristics which are exhibited when there is a break in the power line, and the step of comparing the information stored in the first memory with the information in the data storage circuit.

* * * * *